United States Patent [19]
Hinden et al.

[11] 3,858,024
[45] Dec. 31, 1974

[54] MULTI-HEAD RESISTANCE WELDING APPARATUS

[75] Inventors: Milton Hinden, Massapequa; Charles Giannone, North Babylon, both of N.Y.

[73] Assignee: Duro-Dyne Corporation, Farmingdale, N.Y.

[22] Filed: Nov. 7, 1973

[21] Appl. No.: 413,665

Related U.S. Application Data
[63] Continuation-in-part of Ser. No. 323,099, Jan. 12, 1973.

[52] U.S. Cl. ................................. 219/98, 219/119
[51] Int. Cl. ............................................ B23k 9/20
[58] Field of Search ..................... 219/98, 99, 119

[56] References Cited
UNITED STATES PATENTS

| | | | |
|---|---|---|---|
| 2,096,495 | 10/1937 | Hogg | 219/99 |
| 3,526,743 | 9/1970 | Spisak | 219/98 |
| 3,582,603 | 6/1971 | Hinden | 219/99 |
| 3,679,860 | 7/1972 | Spisak | 219/98 |

*Primary Examiner*—J. V. Truhe
*Assistant Examiner*—Kenneth Hairston
*Attorney, Agent, or Firm*—Mark T. Basseches; Paula T. Basseches

[57] ABSTRACT

The invention relates to resistance welding apparatus for simultaneously attaching pins or clips to a metallic substrate carrying a batt of insulation and to a method of effecting such attachments. A support surface is provided across which the substrate is shifted by frictional drive means. Welding heads having moveable electrodes are disposed above the composite substrate and insulation batt. Pins or clips are automatically fed to the electrodes and driven through the insulation batt and welded to the substrate. A moveable connection between the pins or clips and electrodes permits relative movement in the direction of the composite.

8 Claims, 7 Drawing Figures

PATENTED DEC 31 1974 3,858,024

MULTI-HEAD RESISTANCE WELDING APPARATUS

This application is a continuation-in-part of application Ser. No. 323,099, filed Jan. 12, 1973, entitled Automatic Resistance Welder.

BACKGROUND OF THE INVENTION

1. Field of the Invention

The present invention is directed to the art of connecting insulation to a substrate intended to be formed into a duct, and more particularly is directed to an automatic resistance welding apparatus for simultaneously connecting, by resistance welding, a series of attachment pins or clips across the width of a continuously fed composite comprising a relatively thick batt of thermal insulating material overlaid upon a thin metallic substrate of sheet metal.

2. The Prior Art

As conducive to an understanding of the present invention, it is to be noted that there is increasing demand for so-called insulated ducting comprising an external sheet metal shell, to the internal surface of which is bonded a continuous batt or thickness of thermal insulating material.

The duct is formed by first securing the batt to the sheet metal, the sheet metal being thereafter bent or formed to the desired duct cross section. Since the insulating material is disposed interiorly of the duct, it is evident that any air flowing through the system must engage against the insulation surfaces within the duct.

It will be readily recognized as a consequence of the foregoing that any separation of insulation from the duct or any stratification or delamination of the insulation will materially and adversely affect the flow characteristics and insulating capacity of the system incorporating the duct.

In view of the importance of forming a secure and permanent connection between substrate and insulation, it is current practice to employ both adhesive bonding techniques and mechanical fastening techniques in effecting the connection.

The problems of securing a pin or clip through insulation to a metal substrate by resistance welding, and certain apparatuses and fasteners and methods for facilitating such operation are considered in detail in U.S. Pat. Nos. 3762,541, 3701,878, 3624,340, 3591,763, 3591,762 and 3582,603, as well as the aforesaid pending application. While the above references greatly facilitate the welding operation, none of the aforementioned apparatuses is especially adapted for the exceedingly high volume production sought as a result of the increasing demand for insulated duct material.

In particular, it was heretofore required for the attachment of a welding pin through insulation to a substrate that the substrate be still or motionless during the period that the weld pin was advanced and the weld was formed since any relative movement between the parts in a direction perpendicular to the axis of the pin would preclude the formation of a proper weld. It will be appreciated that the requirement for stepwise movement of the substrate during production, e. g., advancing of the substrate and insulation, stopping, performance of a weld cycle, subsequent advance, etc., materially reduces the overall speed of operation of a production line, and if the same is to be effected automatically, requires the introduction of expensive intermittent feed devices, Genevas, etc.

SUMMARY

The present invention may be summarized as directed to resistance welding apparatus for rapidly and simultaneously connecting a plurality of spaced pins or clips across the width of a continuously fed composite including a metal substrate to which a batt of insulation has previously been adhesively connected.

The apparatus includes a support surface across which the composite may be fed, and a beam carrying a plurality of welding assemblies in spaced relation to and extending transversely of the support surface. The weld assemblies include linear motor means, such as air cylinders and pistons, for driving an electrode assembly toward and away from the substrate. Means are provided on each weld assembly, such as the means illustrated in the aforesaid copending application, for automatically feeding weld pins from a bulk supply to the electrode.

A characterizing feature of the invention is the provision of a carrier assembly on the electrode for receiving the welding pins, the carrier permitting relative movement between the welding pin and the weld apparatus in the direction of feed of the composite, whereby the weld pins, after entering the insulation, are permitted to advance with, rather than move relative to, the said composite. By thus permitting relative movement between the pin and the weld assembly, it is possible to attach weld pins without interrupting the feed of the insulation and substrate forming the composite.

A further characterizing feature of the invention lies in the provision of frictional drive means for advancing the composite, which drive means permits relative slippage or lost motion between the drive means and the composite being fed, whereby movement of the composite is automatically interrupted by the stalling forces exerted thereon in the course of welding, and resumed when the welding pressures are relieved.

With the foregoing in mind, it is an object of the invention to provide an apparatus of simple design adapted to increase the speed with which pins or clips may be attached through insulation to a metallic substrate by resistance welding.

A further object of the invention is the provision of a device of the type described wherein a plurality of spaced clips or pins may be simultaneously applied.

A further object of the invention is the provision of a device of the type described wherein the pins or clips are applied while the composite of substrate and insulation is continuously being fed and without the necessity for providing apparatus for stepwisely moving the composite.

Still a further object of the invention is the provision of a device of the type described including feed means for the composite including a lost motion connection whereby the composite is continuously urged in the desired direction, yet its movement is automatically interrupted responsive to the movement of the welding apparatus through a welding cycle.

Still a further object of the invention is the provision of a welding device of the type described which may be inserted into existing production facilities used in the manufacture of composite material for subsequent fabrication into insulated ducts without significant alternation of such facilities.

To attain these objects and such further objects as may appear herein or be hereinafter pointed out, reference is made to the accompanying drawings, forming a part hereof, in which.

Figure 1:
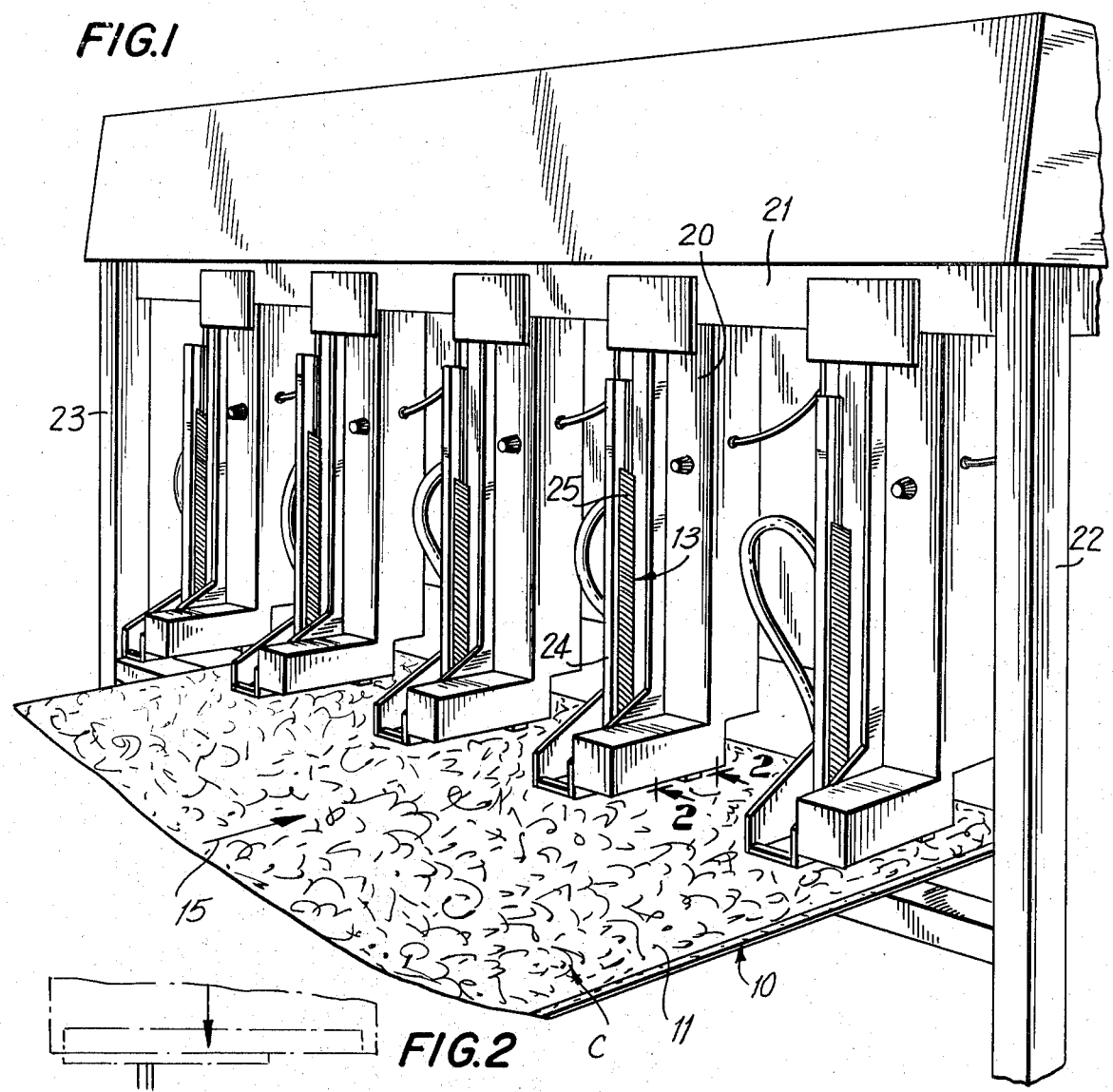
FIG. 1 is a perspective view of portions of the welding device in accordance with the invention.

Turning now to the drawings, there is disclosed in FIG. 1 a multiple head welding apparatus for securing, by resistance welding, a series of pins or clips to a metal duct substrate 10 whereby a relatively thick batt or slab of insulation 11, which has preferably previously been adhesively connected to the substrate, may be positively prevented from separation from the substrate or from delamination.

Figure 2:
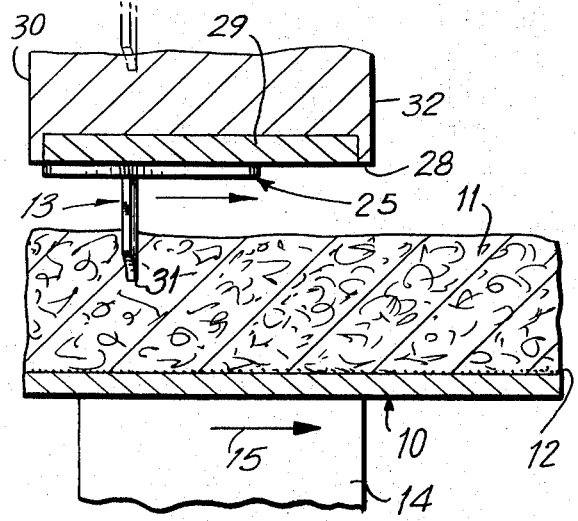
FIG. 2 is a fragmentary diagrammatic view depicting the position of the electrode and a weld pin supported thereby during the initial stage of the welding cycle.

As seen in FIG. 2, the substrate 10 may comprise galvanized sheet metal of a suitable gauge for the formation of ducts, to which an insulation layer 11 comprising fiber glass fortified with resinous bonding material has preferably been adhesively secured, as by an adhesive layer 12.

The insulation layer 11, as is well known, may be one inch or more in thickness and is typically of relatively low density, being readily penetrable by the sharpened welding pins or clips 13. Suitable pins or clips are described in detail in the aforesaid U.S. Pat. No. 3701,878.

The welding apparatus includes a support surface or table 14 which is horizontally disposed, the composite comprising the substrate 10 and insulation 11 being progressively advanced across the support 14 in the direction 15 — see FIG. 1.

Figure 4:
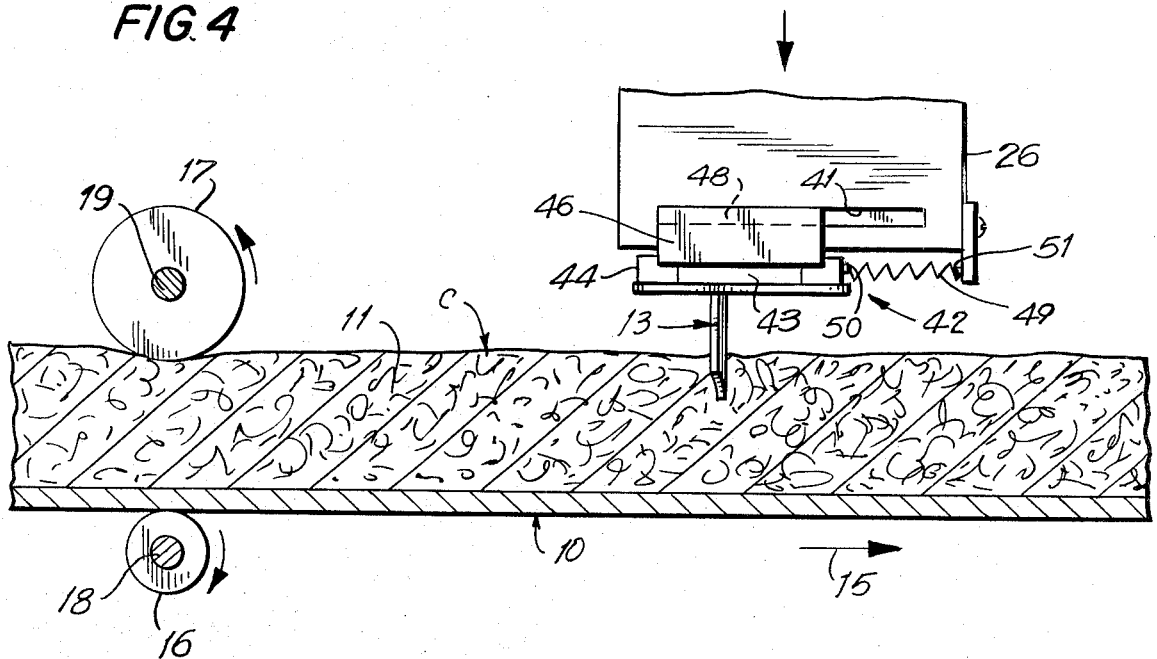
FIG. 4 is a diagrammatic view of a further embodiment of the invention, including suitable drive means.

A suitable form of lost motion drive apparatus for advancing the composite material in the desired direction is diagrammatically disclosed in FIG. 4, and includes a transversely extending lower roller member 16, an upper parallel roller member 17, the rollers 16 and 17 being spaced apart a distance slightly less than the normal or unstressed total thickness of the composite comprising the insulation 11 and substrate 10.

Figure 5:
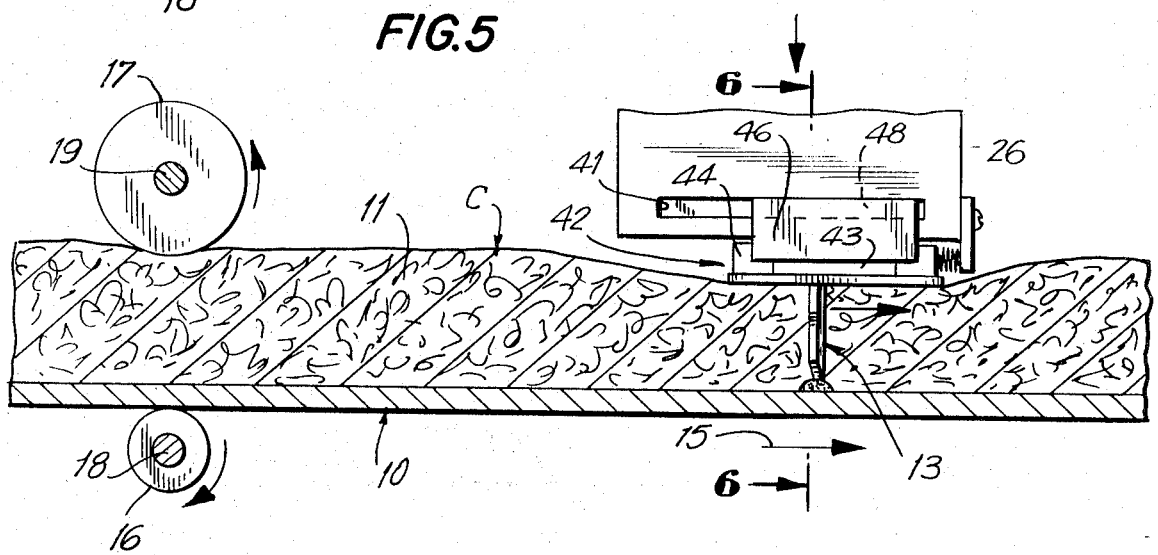
FIG. 5 is a view similar to FIG. 4 at a further advanced stage of the welding cycle.

One or both of the rollers are driven by a force applied through the axes 18, 19, respectively, in the direction indicated by the arrows in FIGS. 4 and 5 such that the insulation and substrate are advanced in the direction 15.

As a result of the readily compressible nature of the insulation 11 and the limited forces with which the rollers are pressed against the composite, a lost motion connection is provided whereby, if a substantial stalling force is exerted on the composite, the rollers will merely rotate relative to the material being fed without damaging the same or without advancing the same. When the stalling force is removed, the rollers are effective to continue the advance of the composite.

In practice, the feed of the composite material advanced by the rollers may, by way of example, be at the rate of about 40 feet per minute.

The composite material C comprising the substrate 10 and insulation 11 is moved beneath a series of welding assemblies 20 supported on horizontal beam structure 21 fixed to the vertical side frame members 22, 23 of the apparatus. The weld assemblies 20 may preferably be adjusted transversely of the beam 21 such as to permit a variation of spacing between the assemblies. Optionally but preferably, the weld assemblies conform substantially to the structures disclosed in the above recited copending application.

Briefly, the weld assemblies in accordance with said application include magazines 24 carrying a multiplicity of welding pins or clips 13 having flat heads 25, details of a preferred form of pins or clips and magazine being disclosed in U.S. Pat. No. 3762,541. It is sufficient for an understanding of the instant invention to note that the welding apparatus 20 includes an electrode 26 fixed to the lower end of a piston rod 27 — see FIG. 7, the piston rod extending from an air cylinder member (not shown). Upon energization of the appropriate circuit, the piston rods 27 will simultaneously be shifted downwardly toward the composite C.

As set forth in the copending application, individual weld pins are sequentially extracted from the magazines holding a multiplicity of such pins, and fed to the welding electrode. Upon energization of the drive cylinder, the piston is shifted downwardly advancing the weld pin progressively through the insulation and into contact with the metal substrate, a weld current flowing through the pin and into the grounded substrate, enabling the formation of a resistance weld connection between the pin and the substrate.

Following completion of the weld, the device automatically cycles to retract or lift the piston 27, whereupon the next succeeding weld pin will be shifted from the magazine to the welding electrode.

In order that the welding apparatus be adapted for securing weld pins or clips to a moving composite C, means are provided on the electrode 26 which permit a relative movement between the weld pin and the electrode in the direction of feed of the composite. To this end, and as shown in the embodiment of FIG. 2, the electrode 26 includes on its under surface 28 a permanent magnet member 29 which is elongated in a direction paralleling the direction of movement 15 of the composite.

As shown in FIG. 2, the weld pin 13 is fed by the automatic mechanisms to the permanent magnet 29 at a position adjacent the trailing or downstream end 30 of the electrode, the relative dimensions of the electrode components being somewhat magnified in the accompanying drawings for purposes of clarity.

The permanent magnet 29 strongly atracts the head 25 of the steel welding pin 13, it being the nature of the connection between the magnet and head that a degree of sliding movement between the noted parts may take place while the head is still under the influence of the permanent magnet member.

Figure 3:
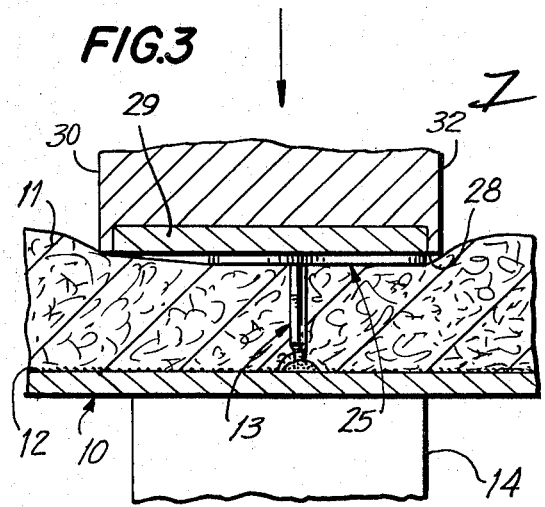
FIG. 3 is a view similar to FIG. 2 at a further stage of the cycle.

Referring specifically to FIGS. 2 and 3, it will be seen that in FIG. 2 the sharpened tip 31 of the weld pin has been caused by the descending piston 27 to enter into the body of the insulation material 11. As the electrode continues downwardly, the composite C continues to be fed in the direction 15, whereupon, by reason of the entry of the pin into the insulation, the pin will be caused to scan the permanent magnet surface 29 in the direction from the trailing side 30 of the electrode toward the lead edge 32 thereof. With continued downward movement of the electrode 26, the pin will have been advanced through the insulation, the tip of the pin being forced into contact with the metal substrate 10 of the composite C.

In the welding apparatus of the above cited pending application, the flow of welding current may be initiated by pressure sensitive apparatus operatively connected to the fluid in the cylinder chamber driving the piston 27, the circuit being triggered by a pressure build up of predetermined magnitude. The pressure may be selected at a level to be achieved only after the pin is engaged against the substrate. While the above described weld circuit triggering arrangement may be employed in the weld apparatus of the present invention, it is preferred that the primary of the weld transformer be energized just prior to engagement of the sharpened tip 34 of the weld pin against the substrate 10. By triggering the welding circuit prior to such engagement, there is assured a welding current flow at the moment of contact between the sharpened tip 31 and the substrate, i.e., the tip is still at its maximum sharpened condition at the moment of initial contact.

Such an arrangement has been determined to provide a more rapid and superior weld connection as contrasted with energizing the welding circuit after contact, with consequent blunting of the weld pin tip before current flow occurs. In either event, i.e., whether the weld circuit is triggered prior to or subsequent to contact, when the welding pin is compressed between the descending electrode at its upper surface and the substrate supported on the support member 14 on its lower surface, a sufficient stalling force or drag is exerted against the composite to prevent the composite from continuing to move in the direction 15, it being recalled that the composite is urged in such direction by a frictional driving force exerted by the opposed rollers 16, 17. The spacing of the rollers is calculated to permit the movement of the composite to be readily stalled responsive to sufficient pressures generated by compression of the pins against the substrate, the ease of stalling being enhanced by the compressible nature of the insulation.

With movement of the composite stalled, the weld is completed, movement of the composite in the direction 15 being reinstituted by the rollers 16, 17 or by any other suitable non-positive drive means upon retractile upward movement of the piston 27 carrying the electrode.

Where current flow in the primary of the welding transformer is instituted prior to bottoming of the weld pin against the substrate, positive means are provided for preventing excess downward movement and foreshortening of the weld pin shanks.

Figure 7:
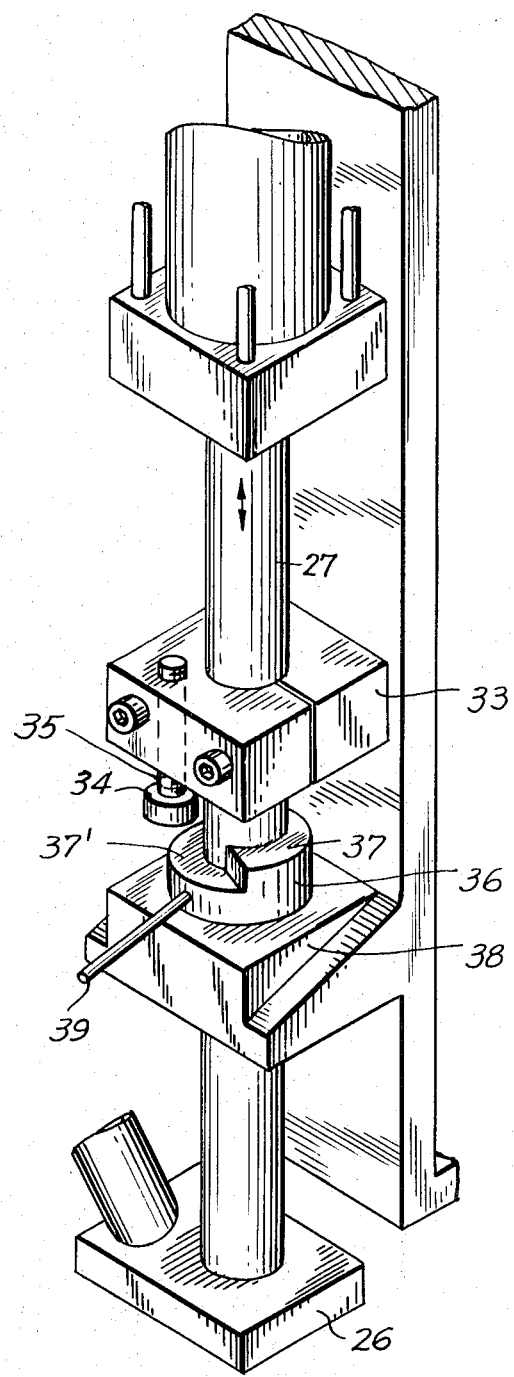
FIG. 7 is a detail view of an adjustable stop mechanism for controlling movement of the welding electrode toward the metal substrate.

As best seen in FIG. 7, a positive stop is provided by a block 33 carrying a depending, vertically adjustable stop adjustment member 34 having a shank 35 threaded into the block. The adjustment member 34 is positioned above a stop collar 36. The collar includes an upwardly facing stop shoulder 37, it being appreciated that when the member 34 engages against the shoulder, further downward movement of the piston rod 27 and the electrode 26 carried thereby is positively precluded.

Preferably the collar 36 through which the piston rod 27 is slidably sleeved is rotatable through a predetermined angular distance on the fixed collar support block 38 to which the collar is mounted. An adjustment handle 39 is provided to facilitate the desired rotation of the collar.

The collar includes a second stop surface 37' at a level below the stop surface 37. When the stop surface 37' is in registry with the adjustment member 34, an orientation which is accomplished by use of the adjustment handle 39, the piston rod and electrode will be permitted more closely to approach the substrate 10. The collar 36 thus provides a means for adapting the apparatus to be used for feeding weld pins having shanks of different lengths, fine depthwise adjustments being achieved by upward or downward threaded movement of the stop 34.

Figure 6:
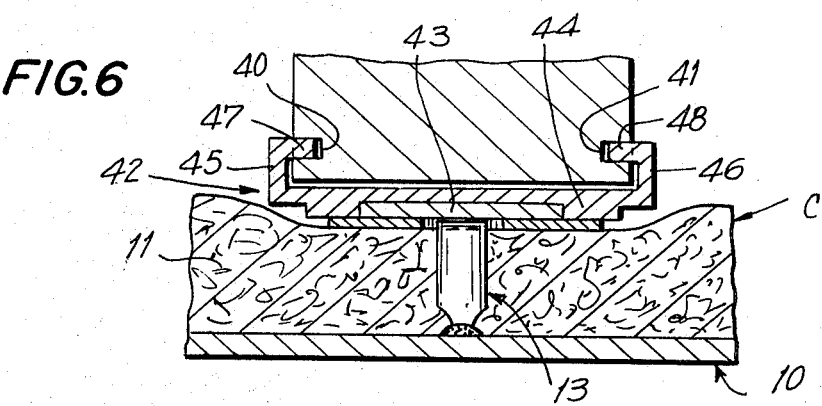
FIG. 6 is a section taken on the line 6—6 of FIG. 5.

In the embodiment of FIGS. 4 to 6, wherein like parts have been given like reference numerals, the electrode 26 is provided at its side edges with an opposed pair of tracks 40, 41, the tracks being aligned with the direction of movement 15 of the composite C.

In accordance with such embodiment, a carrier member 42 is provided, the carrier including a permanent magnet 43 supported within a conductive block 44. The block includes upwardly directed side flanges 45, 46 having inturned guide ledges 47, 48 slidable within tracks 40, 41. The carrier 42 is normally maintained in its downstream position, as shown in FIG. 4, by a return spring 49 biased between lead edge 50 of the carrier and a spring retainer seat 51 depending from the electrode.

From the above description it will be understood that the operation of the embodiment of FIGS. 4, 5 and 6 is similar to that of FIGS. 2 and 3 except that after the shank of the weld pin 13 is forced into the insulation 11, downstream relative movement of the pin and the electrode is accommodated by a left to right movement of the carrier 42 relative to the electrode or a combination of such movement and a sliding of the pin relative to the magnet 43 rather than the pure sliding movement of pin relative to magnet 29 functioning as a carrier.

As previously noted, the composite C may advance at a rate of about 40 feet per minute or 8 inches per second.

Empirical measurements on an operating apparatus in accordance with the invention have indicated that satisfactory results may be obtained, assuming an advance speed by the composite of approximately 35 to 40 feet per minute, with an operating cycle lasting approximately 0.55 seconds—that is to say, approximately 0.55 seconds of time elapse from the initiation of downward movement of the welding electrode until return of the electrode to its initial raised position. Included in such elapsed time is an actual contact period between weld pin and substrate of approximately 0.2 seconds. It has been determined that the noted time period is sufficient to effect a satisfactory weld connection between the substrate and a pin of the type described in detail in U.S. Pat. No. 3701,878 through the use of welding apparatus developing peak weld current of approximately 50 amps.

It has been empirically determined that the advancing composite is brought to a substantially complete stop within a very short period after metal to metal contact between the weld pin and substrate.

Preferably, the force which is exerted by the rollers 16, 17 against the upper and lower surfaces of the composite is adjusted to the minimum required for feed, the requisite forces varying somewhat in accordance with the frictional characteristics of the surfaces across which the composite is drawn.

From the above described procedures it will be appreciated that in view of the fact that the flow of the composite is readily stalled by metal to metal contact, the principal tendency of relative movement between the weld pin and the electrode occurs during the time when the pins are traversing the insulating layer 11, but before the pins reach the substrate 10. While precise measurements of elapsed time are difficult to obtain, an estimated insulation traverse period of approximately 0.09 seconds has been extrapolated as a result of observing the degree of movement of the weld pins relative to the electrode, assuming a known and constant speed of advance of approximately 40 feet per minute, and further assuming a substantially instantaneous stall upon metal to metal contact. Relative movements in the order of from about 0.5 inches, and in some instances less, to about 0.9 inches have been observed.

In the use of multiple head systems, slight variations have been observed in the degree of relative movement between the pins affixed by the various welding heads in the course of a given welding cycle. It is theorized that such variations result from factors such as irregularities in the height of the insulation which is in registry with a particular weld pin, slight variations in the speed of advance of the piston rods of the various welding assemblies, resulting perhaps from pressure differentials or the time of pressure application to the individual cylinders, variations in length of the weld pins, etc.

Although in theory it may be anticipated that the possibility of engagement of a given weld pin against the substrate prior to engagement of the other pins might introduce a skewing of the composite and thus require the use of guide means to prevent skewing, relatively little tendency toward skewing has been observed. Thus, while it may be advisable to provide some form of guide in the area of the weld, it has been found that by supporting the pay off and take up components in a desired relationship, sufficient guidance for the material being processed is provided.

Manifestly, the movement of the material beneath the weld components is, in effect, intermittent as a result of the stalling forces applied, and it is accordingly desirable to provide a substantial slack in the material at least in the area prior to the welding zone, and also preferably in the area between such zone and the take up mechanism, to accommodate the noted intermittent feed.

As previously noted, the welding is preferably effected by powering the primary of the welding transformer prior to contact of the tip of the weld pin with the metallic substrate. This sequence has been found preferable to one in which energization of the weld transformer follows contact of the pin with the substrate. It is believed that the improved performance resulting from the pre-energization of the weld transformer is the result of the fact that the weld pin tip is at its maximum sharpness when the tip engages the substrate, permitting the formation of a superior weld in a shorter period of time than is the case where the sharpened weld pin is impacted against the substrate and the current flow follows. In the latter case it is believed that the impact blunts the weld pin, with the result that an increased weld time is required for effecting connection of a pin.

From the foregoing it will be understood that there is disclosed, in accordance with the present invention, an improved multi-head weld apparatus operating on the resistance welding principle, for attaching across the width of a continuously fed composite of insulation and metal substrate a series of welding pins which afford mechanical connection and prevent delamination of the insulating material.

It will be understood that the attachment of weld pins to a moving composite stock presents unique problems in that, due to the thickness of the insulating material, being in the order of about 1 inch, a significant time period for penetration of the insulation is required. The apparatus of the present invention is particularly adapted to be interposed in existing production lines for the manufacture of composite material by adhesive application in that the existing drive means for advancing the adhesive and duct need not be modified for start and stop movements, due to the ability of the welding apparatus itself to compensate for the fact that welds are being performed on continuously fed composites.

The operation of the apparatus of the present invention is dependent in part upon the unexpected discovery that the composite may be stalled by the force exerted through welding pins, notwithstanding that the weld pins are being melted. Moreover, even though downward force exerted through the weld pins which are being melted for attachment to the substrate is relied upon as the means for stalling movement of the composite, the weld connection formed as a result of the operation has been found commercially acceptable.

Numerous modifications may suggest themselves to the skilled worker in the art, in the light of the teachings herein contained. Accordingly the invention is to be broadly construed within the scope of the appended claims.

Having thus described the invention and illustrated its use, what is claimed as new and is desired to be secured by Letters Patent is:

1. A multi-head resistance welding apparatus for simultaneously securing a plurality of resistance welding pins to unite a composite including a metal substrate having an insulating layer thereon, said composite being moved in a predetermined horizontal direction, comprising a frame, a horizontal work support surface on said frame, an elongated support beam on said frame disposed above and in parallel spaced relation to said work support surface, a plurality of resistance welding assemblies mounted in spaced relation along said beam, said assemblies each including linear motor means shiftable in a vertical direction toward and away from said support surface, electrode means mounted on the lower end portions of each of said motor means, automatic means on said weld assemblies for sequentially feeding headed weld pins from a bulk supply, carrier means on said electrode means for receiving pins from said supply, said carrier means supporting said pins while in welding position for movement relative to said electrode in said predetermined horizontal direction while maintaining a conductive connection between said pins and said electrode, whereby said pins are retained on said carrier in position to be welded to said substrate notwithstanding relative movement between said pins and electrode resulting from contact of said pins and said moving insulating layer.

2. The apparatus of claim 1 wherein said carrier means includes a surface parallel with and elongated in said predetermined horizontal direction and includes magnetic means for supporting said heads on said surface, said head portions of said pins being slidable along said surface in the course of said relative movement.

3. The apparatus of claim 1 and including guide track means interposed between said electrode and said carrier means for connecting said carrier means and electrode while permitting relative movement in said direction.

4. The apparatus of claim 3 wherein said carrier means includes magnetic means for supporting said heads of said pins.

5. Apparatus in accordance with claim 4 and including spring means biased between said carrier means and said electrode and yieldingly urging said carrier means in a direction opposite said predetermined direction.

6. A multi-head resistance welding apparatus for simultaneously securing a plurality of resistance welding pins to unite a composite including a metal substrate having an insulating layer thereon, said composite being moved in a predetermined horizontal direction, comprising a frame, a horizontal work support surface on said frame, an elongated support beam on said frame disposed above and in parallel spaced relation to said work support surface, a plurality of resistance welding assemblies mounted in spaced relation along said beam, said assemblies each including linear motor means shiftable in a vertical direction toward and away from said support surface, electrode means mounted on the lower end portions of each of said motor means, automatic means on said weld assemblies for sequentially feeding headed weld pins from a bulk supply, and friction drive means continuously urging said composite in said direction, said drive means providing a lost motion connection with said composite whereby said drive means moves relatively to said composite during formation of a weld, and drives said composite in said direction when a weld is not being formed.

7. The apparatus of claim 6 wherein said drive means includes roller means rotatable about a horizontal axis perpendicular to said direction, said roller means being in light frictional engagment with said composite, the force exerted by said roller means against said composite being selected to permit relative movement of said drive means and said composite during formation of a weld.

8. The method of attaching a weld pin to a continuously fed metallic substrate through insulation layer of substantial thickness carried by said substrate by resistance welding, comprising continuously frictionally urging said substrate along a predetermined linear path over a support surface, progressively advancing an electrode carrying a weld pin toward said substrate in a direction normal thereto, progressively to urge said pin through said layer and into contact with said substrate supported on said surface, said pin being supported on said electrode for movement in the direction of said linear path and being in conductive contact therewith, thereafter increasing the pressure with which said pin is forced against said substrate to a value sufficient to stall movement of said substrate in said direction, causing a welding current to flow through said electrode, pin and substrate to weld said pin to said substrate, and thereafter relieving the pressure exerted by said electrode on said head to permit continued feed of said composite.

* * * * *